(12) United States Patent
Kang et al.

(10) Patent No.: US 10,020,660 B2
(45) Date of Patent: Jul. 10, 2018

(54) BIDIRECTIONAL DC-DC CONVERTER

(71) Applicant: POSTECH ACADEMY-INDUSTRY FOUNDATION, Pohang-si (KR)

(72) Inventors: Bong Koo Kang, Pohang-si (KR); Sang Won Lee, Daejeon-si (KR); Kyung Min Lee, Daejeon-si (KR); Yoon Geol Choi, Seoul (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 133 days.

(21) Appl. No.: 15/338,227

(22) Filed: Oct. 28, 2016

(65) Prior Publication Data

US 2017/0126028 A1 May 4, 2017

(30) Foreign Application Priority Data

Oct. 29, 2015 (KR) .................. 10-2015-0150624

(51) Int. Cl.
*H02J 7/00* (2006.01)
*H02J 7/04* (2006.01)
*H02J 7/16* (2006.01)
*H02M 3/335* (2006.01)

(52) U.S. Cl.
CPC .......... *H02J 7/0014* (2013.01); *H02J 7/0052* (2013.01); *H02J 7/0068* (2013.01); *H02M 3/33507* (2013.01); *H02M 3/33584* (2013.01); *H02J 7/0065* (2013.01); *H02J 2007/0059* (2013.01); *Y02B 40/90* (2013.01)

(58) Field of Classification Search
CPC .................................................. H02J 7/0068
USPC ....................................................... 320/128
See application file for complete search history.

(56) References Cited

U.S. PATENT DOCUMENTS

2015/0097546 A1* 4/2015 Pan ................. H02M 3/158
    323/311
2016/0181925 A1* 6/2016 Chiang ............ H02M 3/33584
    363/17

FOREIGN PATENT DOCUMENTS

JP    2005-261059 A    9/2005
JP    2008-099423 A    4/2008

OTHER PUBLICATIONS

Molavi et al., "High Step-Up/Down DC-DC Bidirectional Converter with Low Switch Voltage Stress," Feb. 2015, The 6th International Power Electronics Drive Systems and Technologies Conference (PEDSTC2015), p. 163-167.

(Continued)

*Primary Examiner* — Edward Tso
*Assistant Examiner* — Ahmed Omar
(74) *Attorney, Agent, or Firm* — McDermott Will & Emery LLP

(57) ABSTRACT

The present invention relates to a technique for implementing a bidirectional DC-DC converter applied to an energy storage system.

The bidirectional DC-DC converter includes a magnetically coupled inductor and a charging/discharging voltage storage unit between a DC link power supply and a battery power supply, and implements a high gain through a two-step voltage transformation process when a charging process or discharging process is performed. Thus, the bidirectional DC-DC converter can reduce the construction cost of the battery cell, guarantee a high voltage available range, and reduce the influence of leakage inductance.

12 Claims, 8 Drawing Sheets

(56) References Cited

OTHER PUBLICATIONS

Manoharan et al., "Close Loop Control of Non-Isolated Bidirectional DC/DC Converter," IOSR Journal of Engineering, Jun. 2013, pp. 37-43, vol. 3, Issue 6.

* cited by examiner

BIDIRECTIONAL DC-DC CONVERTER

BACKGROUND

1. Technical Field

The present disclosure relates to a technique for implementing a bidirectional DC-DC converter applied to an energy storage system, and more particularly, to a bidirectional DC-DC converter capable of achieving a high gain through a two-step voltage transformation process when a charging or discharging process is performed between a DC link power supply and a battery power supply.

2. Related Art

An ESS (Energy Storage System) includes a PCS (Power Conversion System), a BMS (Battery Management System), and an EMS (Energy Management System) for controlling the ESS. The PCS serves to convert power supplied from various energy sources into a common AC voltage or a voltage suitable for being stored in a battery cell. At this time, energy conversion is required in both directions between the battery cell and the voltage of a DC link. Such a role is performed by PCS which is referred to as a bidirectional DC-DC converter.

In the case of a battery cell, a model for providing various types of voltages has been proposed. However, since a voltage and capacity provided from a unit battery cell are low, a large number of battery cells are connected in series/parallel in order to cope with a load. If a bidirectional DC-DC converter having a high gain between the DC link and the battery can be designed, the number of battery cells connected in series can be reduced to secure a competitive price, and an additional cost used for a battery cell management system can be reduced.

FIG. 1 is a circuit diagram of a conventional bidirectional buck booster-type DC-DC converter. As illustrated in FIG. 1, the bidirectional buck booster-type DC/DC converter includes a DC link $V_{DC}$, switches Q11 and Q12, an inductor L11 and a battery cell module (battery pack) 11. The switches Q11 and Q12 may include MOS transistors, and the battery cell module 11 may include battery cells coupled in series and parallel.

Referring to FIG. 1, a pair of switches Q11 and Q12 are complementarily operated in a charge/discharge mode. Thus, the battery cell module 11 is charged with power of the DC link $V_{DC}$ through the inductor L11, or discharged through the DC link $V_{DC}$.

The conventional bidirectional buck booster-type DC/DC converter has advantages in that the basic structure thereof is simple and the charging/discharging control structure for the battery cell module is simple. However, the conventional bidirectional buck booster-type DC/DC converter requires a large number of battery cells connected in series to the battery cell module, because the voltage conversion ratio is low.

FIG. 2 is a circuit diagram of a conventional bidirectional flyback-type DC-DC converter. As illustrated in FIG. 2, the conventional bidirectional flyback-type DC-DC converter includes switches Q21 and Q22, inductors L21 to L23, a transformer TR21 and a battery cell module 21. The switches Q21 and Q22 include MOS transistors, and the battery cell module 21 includes battery cells connected in series and parallel.

Referring to FIG. 2, the pair of switches Q21 and Q22 are complementarily operated in a charge/discharge mode. Thus, the battery cell module 21 is charged with power of the DC link $V_{DC}$ through the inductors L21 to L23, or discharged through the DC link $V_{DC}$.

The conventional DC-DC converters can insulate the DC link and the battery cell module from each other through the transformer, and control a voltage gain by adjusting the turn ratio of the transformer. However, due to a voltage spike caused by leakage inductance of the transformer, the stability of the converters may be degraded.

FIG. 3 is a circuit diagram of a conventional bidirectional buck boost-type DC-DC converter. As illustrated in FIG. 3, the conventional bidirectional buck boost-type DC-DC converter includes switches Q31 and Q32, inductors L31 and L23 and a battery cell module 31.

The converter of FIG. 3 has an improved architecture, compared to the bidirectional buck booster-type DC-DC converter of FIG. 1.

The conventional DC-DC converters can implement a high voltage conversion ratio using the magnetically coupled inductors. However, due to a sudden change of leakage inductance current, a high voltage spike may be caused to degrade stability. Furthermore, since the conventional DC-DC converters have a low available range, using the conventional DC-DC converters has many limitations.

SUMMARY

Various embodiments are directed to a bidirectional DC-DC converter capable of achieving a high gain through a two-step voltage transformation process when a charging process or discharging process is performed between a DC link power supply and a battery power supply.

In an embodiment, a bidirectional DC-DC converter may include: a magnetically coupled inductor configured to store electrical energy supplied from a battery power supply or output electrical energy stored therein in a boost converter mode, and charge the battery power supply with electrical energy stored therein or store electrical energy supplied from a DC link power supply in a buck converter mode; a magnetically-coupled-inductor driving unit configured to switch a driving path between first and second wires of the magnetically coupled inductor such that the magnetically coupled inductor stores electrical energy supplied from the battery power supply or charges the battery power supply with electrical energy stored therein; a charging/discharging voltage storage unit configured to store electrical energy supplied from the magnetically coupled inductor or discharge electrical energy stored therein toward the DC link power supply in the boost converter mode, and store electrical energy supplied from the magnetically coupled inductor or the DC link power supply or discharge electrical energy stored therein toward the magnetically coupled inductor in the buck converter mode; a first switch unit configured to serve as a diode or switch to transfer electrical energy between the charging/discharging voltage storage unit and the magnetically coupled inductor in the boost converter mode or the buck converter mode; and a second switch unit configured to serve as a diode or switch to transfer electrical energy between the DC link power supply and the charging/discharging storage unit in the boost converter mode or the buck converter mode.

DETAILED DESCRIPTION

Hereafter, exemplary embodiments will be described below in detail with reference to the accompanying drawings.

Figure 1:
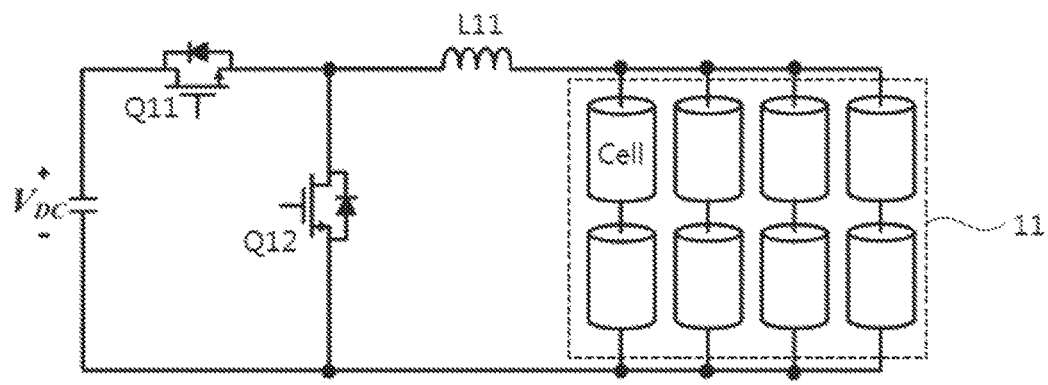
FIG. 1 is a circuit diagram of a conventional bidirectional buck booster-type DC-DC converter.
Figure 2:
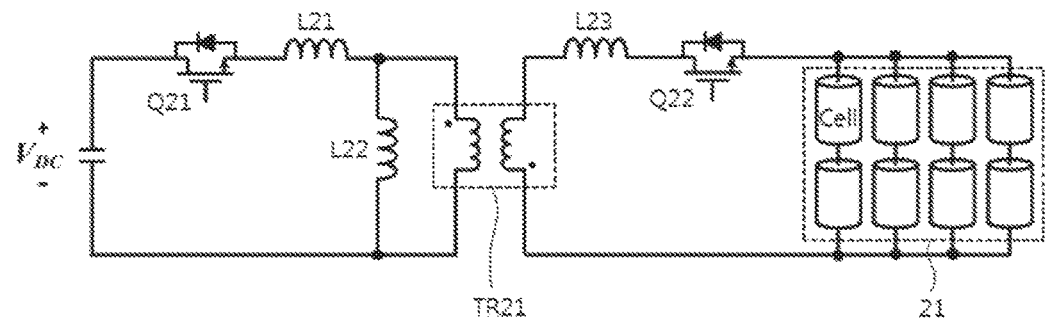
FIG. 2 is a circuit diagram of a conventional flyback-type DC-DC converter.
Figure 3:
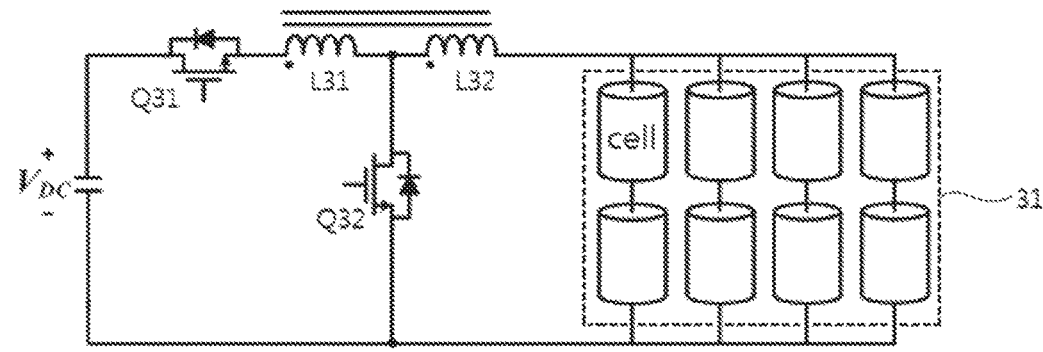
FIG. 3 is a circuit diagram of a conventional bidirectional buck booster-type DC-DC converter.
Figure 4:
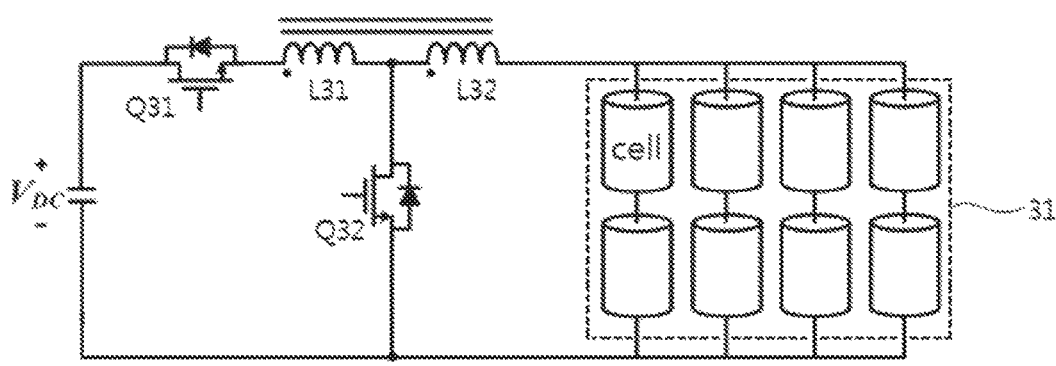
FIG. 4 is a circuit diagram of a bidirectional DC-DC converter according to an embodiment of the present invention.

FIG. 4 is a circuit diagram of a bidirectional DC-DC converter according to an embodiment of the present invention. As illustrated in FIG. 4, the bidirectional DC-DC converter 400 includes a magnetically coupled inductor 410, a magnetically-coupled-inductor driving unit 420, a charging/discharging voltage storage unit 430, a first switch unit 440 and a second switch unit 450.

The magnetically coupled inductor 410 serves to store electrical energy supplied from a battery power supply $V_{bat}$ or output electrical energy stored therein, in a boost converter mode where the battery power supply $V_{bat}$ is discharged toward a DC link power supply $V_{DC}$. Furthermore, the magnetically coupled inductor 410 serves to charge the battery power supply $V_{bat}$ with electrical energy stored therein or store electrical energy supplied from the DC link power supply $V_{DC}$, in a buck converter mode where the battery power supply $V_{bat}$ is charged with the electrical energy of the DC link voltage $V_{DC}$.

For this operation, the magnetically coupled inductor 410 includes a first wire Lp and a second wire Ls. The first wire Lp is connected between a first node N1 connected to one terminal of the first switch unit 440 and a positive terminal of the battery power supply $V_{bat}$, and the second wire Ls is connected between a negative terminal of the DC link power supply $V_{DC}$ and a negative terminal of the battery power supply $V_{bat}$.

The magnetically-coupled-inductor driving unit 420 serves as a diode or switch to form a driving path between the first and second wires Lp and Ls of the magnetically coupled inductor 410, such that the magnetically coupled inductor 410 can store electrical energy supplied from the battery power supply $V_{bat}$ or charge the battery power supply $V_{bat}$ with the electrical energy stored therein.

For this operation, the magnetically-coupled-inductor driving unit 420 includes first and second switches S1 and S2. The first switch S1 is connected between the first node n1 and the negative terminal of the battery power supply $V_{bat}$, and the second switch S2 is connected between the positive terminal of the battery power supply $V_{bat}$ and the negative terminal of the DC link power supply $V_{DC}$.

The charging/discharging voltage storage unit 430 serves to store electrical energy supplied from the magnetically coupled inductor 410 or output the electrical energy stored therein toward the DC link power supply $V_{DC}$ in the boost converter mode. Furthermore, the charging/discharging voltage storage unit 430 serves to store electrical energy supplied from the magnetically coupled inductor 410 or the DC link power supply $V_{DC}$ or output the electrical energy stored therein toward the magnetically coupled inductor 410 in the buck converter mode.

For this operation, the charging/discharging voltage storage unit 430 includes an inductor L and a capacitor C which are connected in series between a second node N2 connected to one terminal of the second switch unit 450 and the negative terminal of the DC link power supply $V_{DC}$.

The first switch unit 440 serves as a diode or switch to transfer electrical energy between the charging/discharging voltage storage unit 430 and the magnetically coupled inductor 410 in the boost converter mode or buck converter mode.

For this operation, the first switch unit 440 includes third and fourth switches S3 and S4. The third switch S3 is connected between the first node N1 and a common connection node of the inductor L and the capacitor C, and the fourth switch S4 is connected between the first and second nodes N1 and N2.

The second switch unit 450 serves as a diode or switch to transfer electrical energy between the DC link $V_{DC}$ and the charging/discharging voltage storage unit 430 in the boost converter mode or buck converter mode.

For this operation, the second switch unit 450 includes a fifth switch S5 connected between the positive terminal of the DC link power supply $V_{DC}$ and the second node N2.

Figure 5:
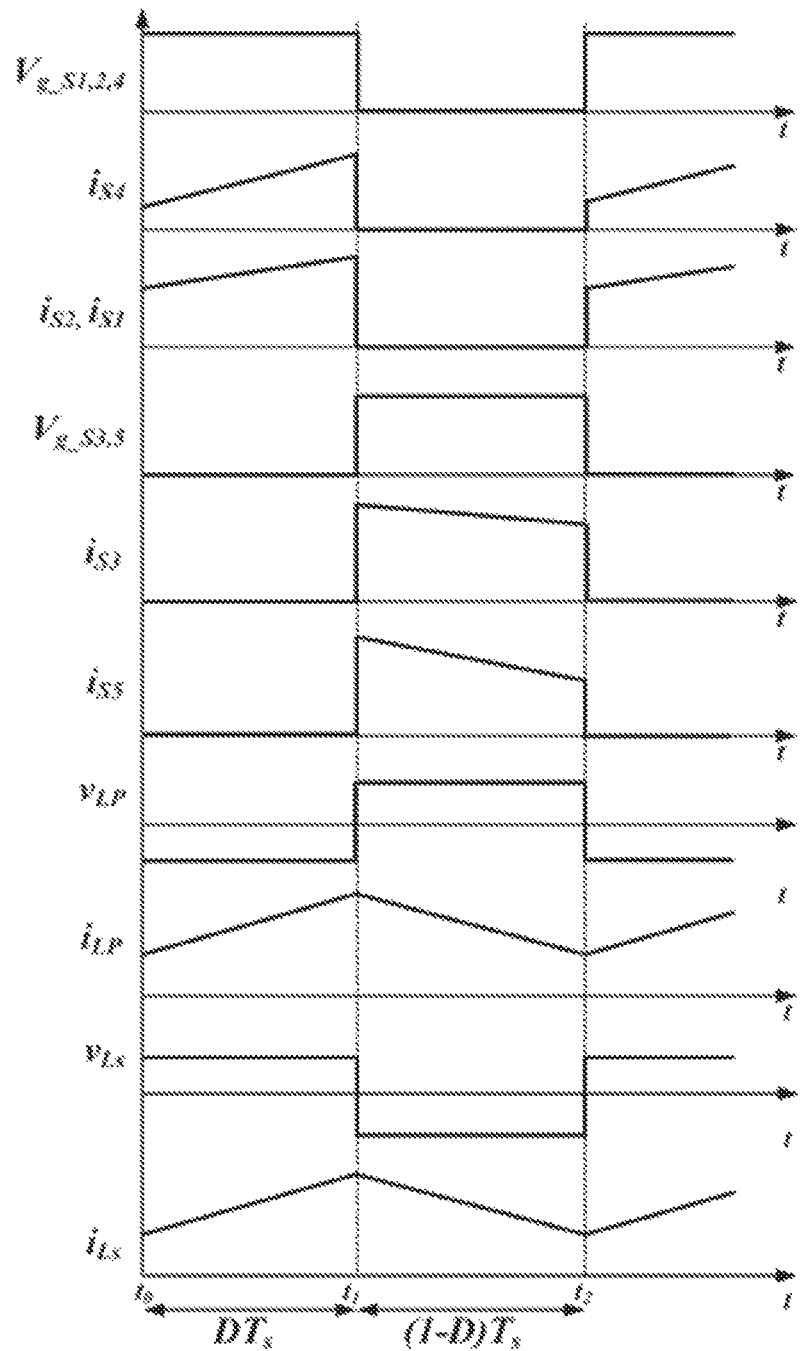
FIG. 5 is waveform diagrams of the respective units of the bidirectional DC-DC converter when the bidirectional DC-DC converter is driven.

In FIG. 4, the switches S1, S2 and S4 are switched by gate voltages $V_{g\_s1}$, $V_{g\_s2}$ and $V_{g\_s4}$ supplied from a control unit (not illustrated), the gate voltages $V_{g\_s1}$, $V_{g\_s2}$ and $V_{g\_s4}$ being illustrated in FIG. 5, and the switches S3 and S5 are switched by gate voltages $V_{g\_s3}$ and $V_{g\_s5}$ supplied from the control unit, the gate voltages $V_{g\_s3}$ and $V_{g\_s5}$ being illustrated in FIG. 5. The types of the switches S1 to S5 are not specifically limited. In the present embodiment, the switches S1 to S5 are embodied by MOS transistors.

Figure 6A:
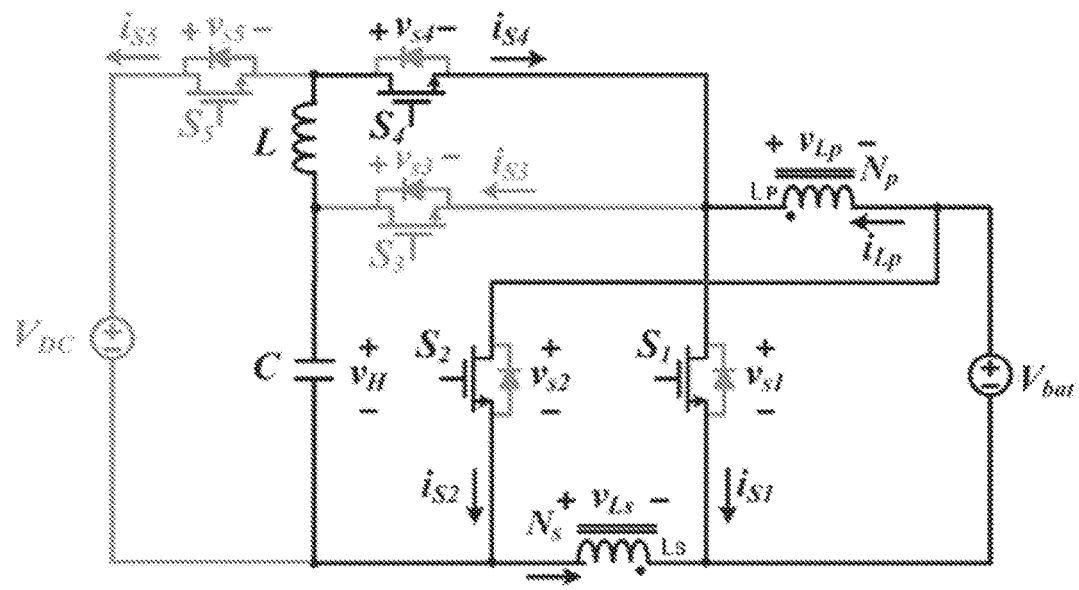
FIG. 6A is a circuit diagram illustrating the operation states of the respective units at a first step when the bidirectional DC-DC converter is driven in a boost converter mode.
Figure 6B:
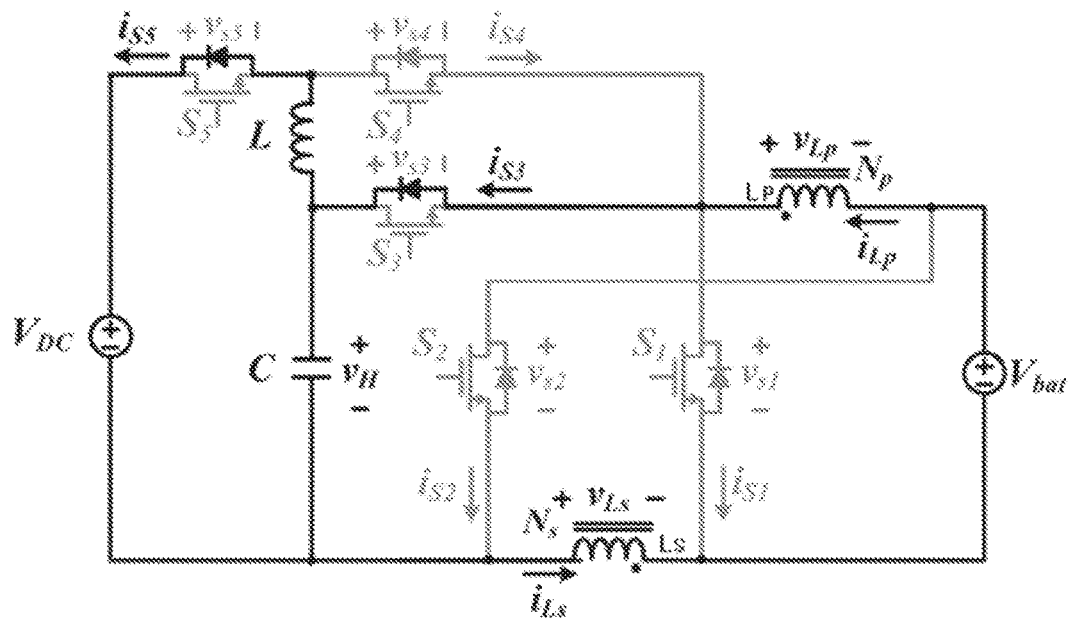
FIG. 6B is a circuit diagram illustrating the operation states of the respective units at a second step when the bidirectional DC-DC converter is driven in the boost converter mode.

FIG. 5 is waveform diagrams of the respective units of the bidirectional DC-DC converter 400, when the bidirectional DC-DC converter 400 is driven in the discharge mode or the boost converter mode for discharging the battery power supply $V_{bat}$ connected to a battery cell toward the DC link power supply $V_{DC}$. FIGS. 6A and 6B are circuit diagrams illustrating the operation states of the respective units at a first step (primary) and a second step (secondary) when the bidirectional DC-DC converter 400 is driven in the boost converter mode.

The first-step operation of the boost converter mode will be described with reference to FIGS. 5 and 6A. At the first step section $t_0$-$t_1$, the first step of the boost converter mode is started as the switches S1, S2 and S4 are turned on by the gate voltages $V_{g\_s1}$, $V_{g\_s2}$ and $V_{g\_s4}$ illustrated in FIG. 5 and the switches S3 and S5 are turned off by the gate voltages $V_{g\_s3}$ and $V_{g\_s5}$ s5 illustrated in FIG. 5. At this time, the turn-on of the switches S1 and S2 charges the magnetically coupled inductor 410 with the electrical energy of the battery power supply $V_{bat}$ according to a ratio (Np:Ns) of the first and second wires Np and Ns of the magnetically coupled inductor 410. At this time, a voltage $V_{LP}$ applied to the first wire Np of the magnetically coupled inductor 410 and a voltage $V_{LS}$ applied to the second wire Ns of the magnetically coupled inductor 410 become equal to the voltage of the battery power supply $V_{bat}$, and may be expressed as Equation 1 for primary and secondary voltages.

$$\frac{di_{Lp}}{dt} = \frac{di_{Ls}}{dt} = \frac{V_{bat}}{(1+k)L} \qquad \text{[Equation 1]}$$

At this time, the switch S4 is turned on to charge the inductor L with electrical energy ($V_{DC}+V_{LS}$) having a level corresponding to the sum of the voltage of the DC link power supply $V_{DC}$ and the voltage $V_{LS}$.

The second-step operation of the boost converter mode will be described with reference to FIGS. 5 and 6B. At the second step section $t_1$-$t_2$, the switches S1, S2 and S4 are turned off by the gate voltages $V_{g\_s1}$, $V_{g\_s2}$ and $V_{g\_s4}$ illustrated in FIG. 5, and the switches S3 and S5 are turned on by the gate voltages $V_{g\_s3}$ and $V_{g\_s5}$ illustrated in FIG. 5. Thus, an electrical energy discharging operation is performed by the switches S3 and S5 serving as diodes. That is, the electrical energy stored in the magnetically coupled inductor 410 is discharged to the capacitor C through a body diode of the switch S3, and the electrical energy stored in the inductor L is discharged to the DC link power supply $V_{DC}$ through a body diode of the switch S5. At this time, the voltage $V_{LP}$ and the voltage $V_{LS}$ of the first and second wires Np and Ns in the magnetically coupled inductor 410, the voltage of the battery power supply $V_{bat}$ and the voltage of the DC link power supply $V_{DC}$ have a relation of $V_{Ls}+V_{Lp}=V_{bat}-V_{DC}$, and a current $i_{LP}$ of the first wire Np and a current $i_{LS}$ of the second wire Ns in the magnetically coupled inductor 410 have a relation of $i_{LS}=i_{LP}$. The relation is expressed as Equation 2 for the primary and secondary voltages.

$$\frac{di_{Lp}}{dt} = \frac{di_{Ls}}{dt} = \frac{V_{bat}-V_H}{2(1+k)L} \qquad \text{[Equation 2]}$$

At the first step of the boost converter mode, the magnetically coupled inductor 410 is charged with the battery voltage $V_{bat}$. At this time, the voltage of the magnetically coupled inductor is affected by mutual inductance and magnetic inductance, and a high-gain electrical energy conversion process is performed. At the second step of the boost converter mode, a high-gain electrical energy conversion process may be performed while the electrical energy stored in the magnetically coupled inductor 410 is discharged toward the DC link power supply $V_{DC}$ through the inductor L of the charging/discharging voltage storage unit 430.

Figure 7:
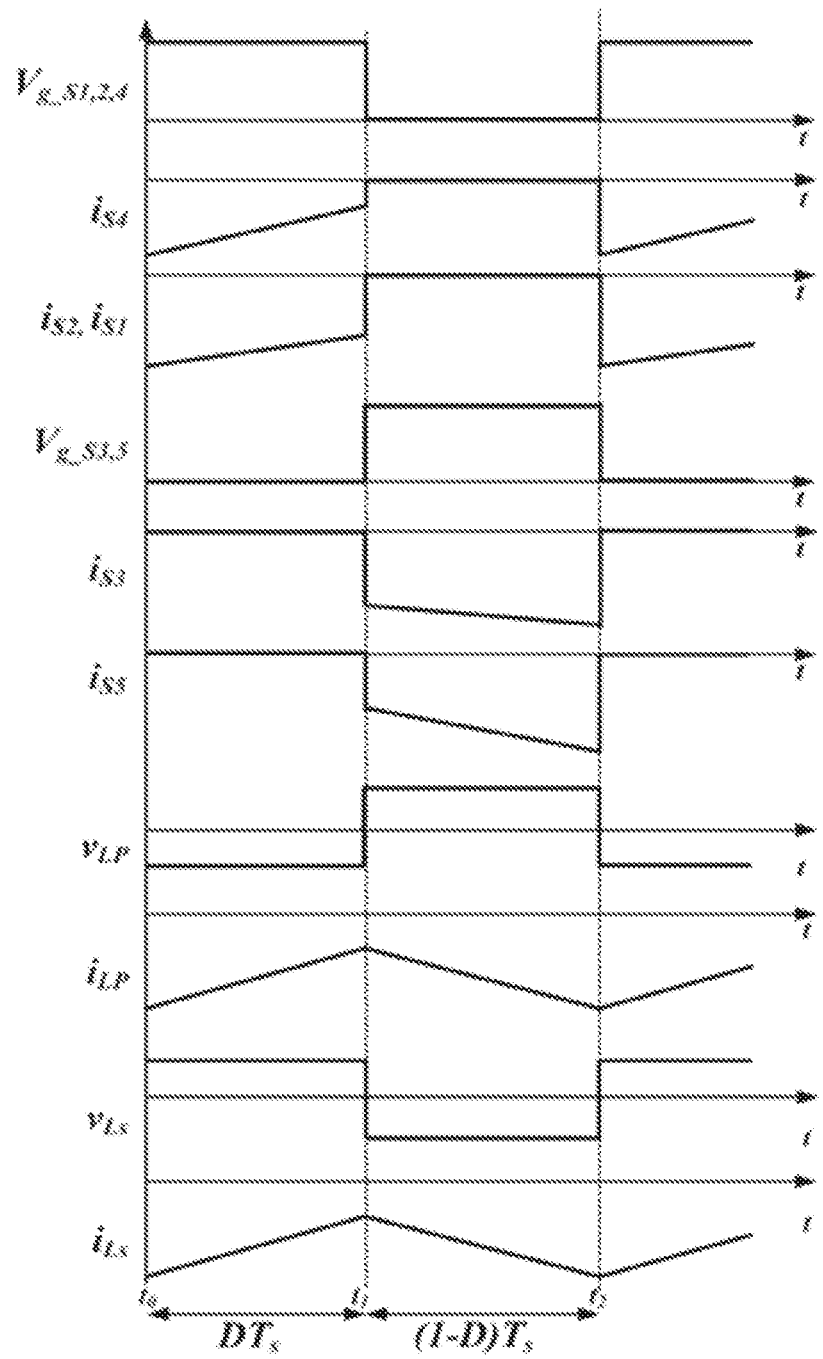
FIG. 7 is waveform diagrams of the respective units of the bidirectional DC-DC converter when the bidirectional DC-DC converter is driven in a buck converter mode.
Figure 8A:
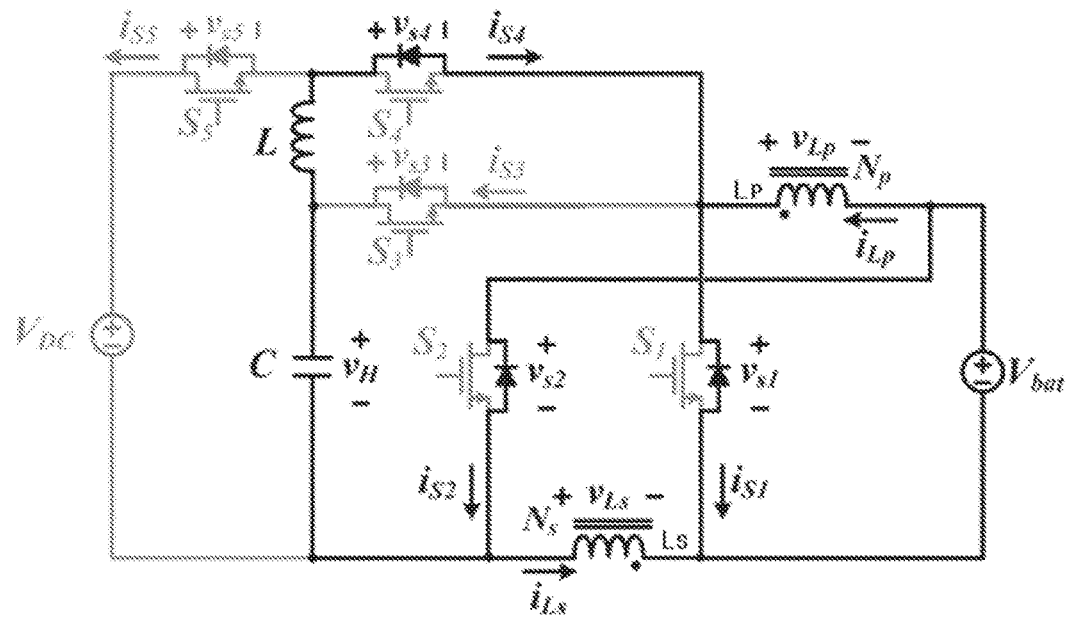
FIG. 8A is a circuit diagram illustrating the operation states of the respective units at a first step when the bidirectional DC-DC converter is driven in the buck converter mode.
Figure 8B:
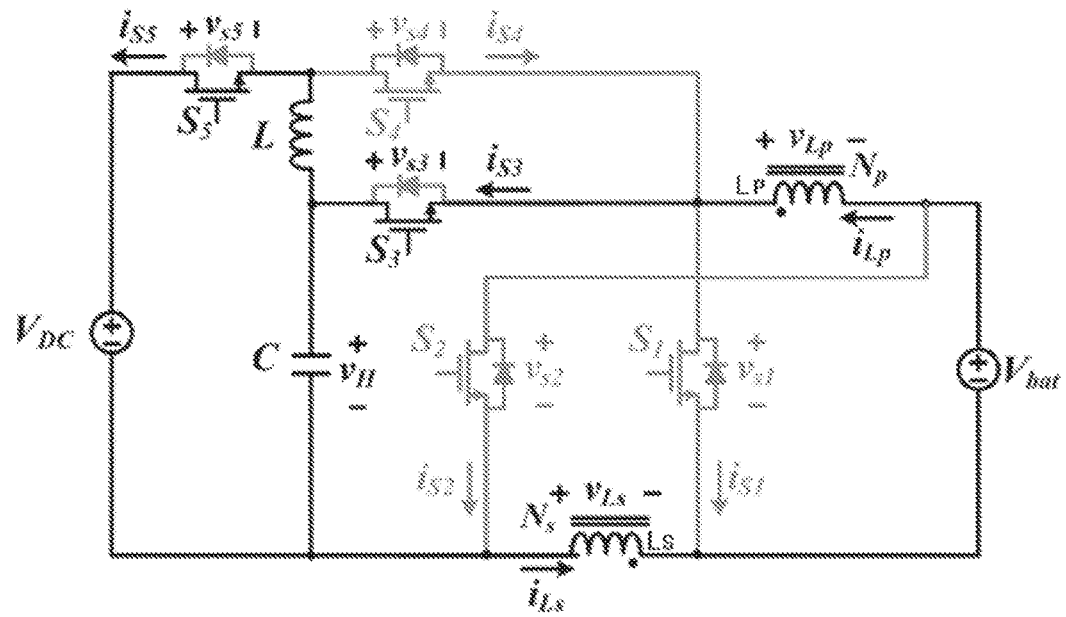
FIG. 8B is a circuit diagram illustrating the operation states of the respective units at a second step when the bidirectional DC-DC converter is driven in the buck converter mode.

FIG. 7 is a diagram illustrating waveforms of the respective units of the bidirectional DC-DC converter 400, when the bidirectional DC-DC converter 400 is driven in the charge mode, that is, the buck converter mode for charging the battery power supply $V_{bat}$ with the electrical energy of the DC link power supply $V_{DC}$. FIGS. 8A and 8B are circuit diagrams illustrating the operation states of the respective units at first and second steps when the bidirectional DC-DC converter 400 is driven in the buck converter mode.

The first-step operation of the buck converter mode will be described with reference to FIGS. 7 and 8A. At the first step section $t_0$-$t_1$, the first step of the buck converter mode is started as the switches S1, S2 and S4 are turned on by the gate voltages $V_{g\_s1}$, $V_{g\_s2}$ and $V_{g\_s4}$ illustrated in FIG. 7 and the switches S3 and S5 are turned off by the gate voltages $V_{g\_s3}$ and $V_{g\_s5}$ illustrated in FIG. 7. At this time, the switches S1, S2 and S4 serve as diodes. Thus, a discharge path is formed by the body diodes of the switches S1 and S4, the inductor L and the capacitor C, and electrical energy discharged from the inductor L1 is stored in the capacitor C. Furthermore, the electrical energy stored in the first and second wires Np and Ns of the magnetically coupled inductor 410 is discharged through the switches S1 and S2, and stored in the battery power supply $V_{bat}$.

At this time, the voltage $V_{LP}$ and the voltage $V_{LS}$ of the first and second wires Np and Ns in the magnetically coupled inductor 410 and the voltage of the battery power supply $V_{bat}$ have a relation of $V_{Ls}=V_{Lp}=V_{bat}$, and may be expressed as Equation 1 for the primary and secondary voltages.

$$\frac{di_{Lp}}{dt} = \frac{di_{Ls}}{dt} = \frac{-V_{bat}}{(1+k)L} \qquad \text{[Equation 3]}$$

The second-step operation of the buck converter mode will be described with reference to FIGS. 7 and 8B. At the first step section $t_0$-$t_1$, the second step of the buck converter mode is started as the switches S1, S2 and S4 are turned on by the gate voltages $V_{g\_s1}$, $V_{g\_s2}$ and $V_{g\_s4}$ illustrated in FIG. 7 and the switches S3 and S5 are turned off by the gate voltages $V_{g\_s3}$ and $V_{g\_s5}$ illustrated in FIG. 7. At this time, the electrical energy supplied from the DC link power supply $V_{DC}$ is stored in the inductor L through the switch S5. Simultaneously, the electrical energy stored in the capacitor C is discharged to the magnetically coupled inductor 410 through the switch S3, and then stored in the first and second wires Np and Ns of the magnetically coupled inductor 410. At this time, the current $i_{LP}$ of the first wire Np, the current $i_{LS}$ of the second wire Ns, the voltage $V_{LP}$ of the first wire Np and the voltage $V_{LS}$ of the second wire Ns in the magnetically coupled inductor 410 have a relation of $i_{LS}=i_{LP}$ and $V_{Ls}+V_{Lp}=V_{DC}-V_{bat}$, and may be expressed as Equation 4 for the primary and secondary voltages.

$$\frac{di_{Lp}}{dt} = \frac{di_{Ls}}{dt} = \frac{V_H-V_{bat}}{(1+k)L} \qquad \text{[Equation 4]}$$

In the buck converter mode, the electrical energy conversion process is performed through the inductor L at the first step, and the electrical energy conversion process is performed through the magnetically coupled inductor 410 at the second step. Thus, the voltage of the magnetically coupled inductor 410 is affected by mutual inductance and magnetic inductance, and a high-gain voltage is affected by mutual inductance and magnetic inductance. Therefore, a high-gain electrical energy conversion process can be performed.

In a typical bidirectional DC-DC converter, the voltage of the battery power supply $V_{bat}$ is expressed as ($V_{bat}=V_{DC}$*duty ratio) in the buck converter mode, and the voltage of the DC link power supply $V_{DC}$ is expressed as $V_{DC}=V_{bat}/(1-$duty ratio$)$ in the boost converter mode. However, the bidirectional DC-DC converter according to the present embodiment has a satisfactory transformation gain through the two-step electrical energy conversion process. The transformation gain may be expressed as Equation.

That is, the voltage of the DC link power supply $V_{DC}$ in the boost converter mode is expressed as Equation 5.

$$V_{DC} = V_{bat} \times \frac{D^2}{2-D^2} \quad \text{[Equation 5]}$$

In Equation 5, D represents the duty ratio.

That is, the voltage of the battery power supply $V_{bat}$ in the buck converter mode is expressed as Equation 6 below.

$$V_{bat} = V_{DC} \times \left\{ \frac{1+D}{(1-D)^2} + \frac{D}{1-D} \right\} \quad \text{[Equation 6]}$$

Figure 9:
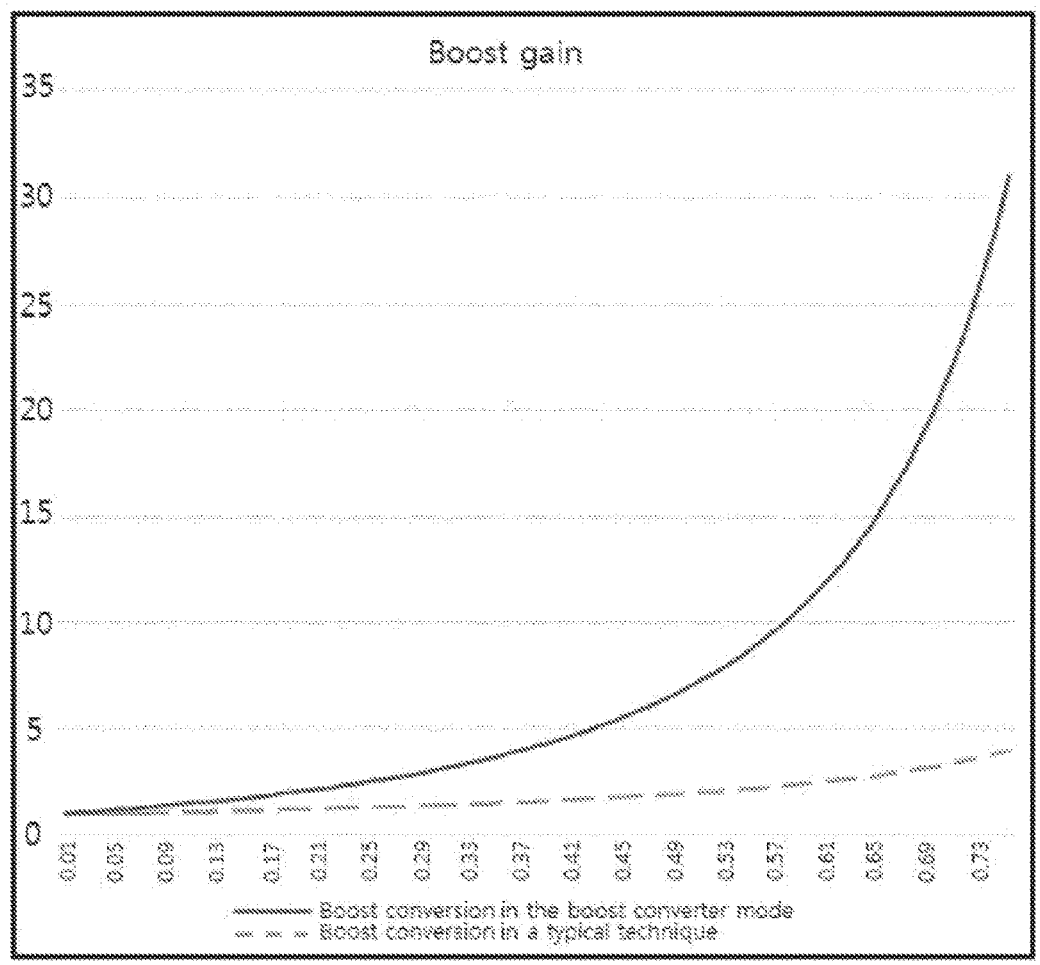
FIG. 9 is a graph comparatively illustrating a conversion gain in the boost converter mode based on a duty ratio according to the present embodiment and a conversion gain in a typical technique.

FIG. 9 is a graph comparatively illustrating a conversion gain in the boost converter mode based on a duty ratio according to the present embodiment and a conversion gain in a typical technique. Referring to FIG. 9, the present embodiment exhibits an improved voltage boosting effect, compared to the typical technique.

Figure 10:
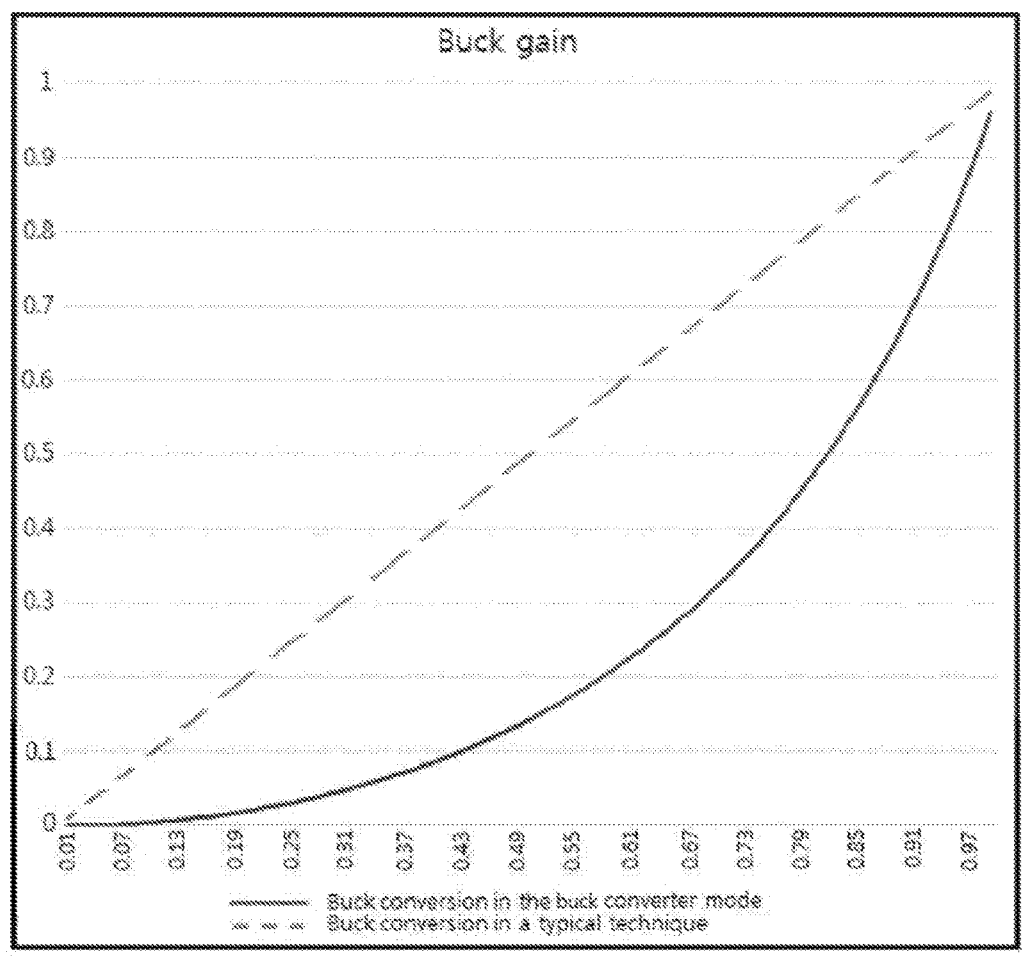
FIG. 10 is a graph comparatively illustrating a conversion gain in the buck converter mode based on a duty ratio according to the present embodiment and a conversion gain in a typical technique.

FIG. 10 is a graph comparatively illustrating a conversion gain in the buck converter mode based on a duty ratio according to the present embodiment and a conversion gain in a typical technique. Referring to FIG. 10, the present embodiment exhibits an improved voltage step-down effect, compared to the typical technique.

According to the embodiment of the present invention, the bidirectional DC-DC converter can perform the charging process or discharging process between the DC link power supply and the battery power supply through the two-step voltage transformation process, thereby reducing the construction cost of the battery cell, guaranteeing a high voltage available range, and reducing the influence of leakage inductance.

While various embodiments have been described above, it will be understood to those skilled in the art that the embodiments described are by way of example only. Accordingly, the disclosure described herein should not be limited based on the described embodiments.

What is claimed is:

1. A bidirectional DC-DC converter comprising:
   a magnetically coupled inductor configured to store electrical energy supplied from a battery power supply or output electrical energy stored therein in a boost converter mode, and charge the battery power supply with electrical energy stored therein or store electrical energy supplied from a DC link power supply in a buck converter mode;
   a magnetically-coupled-inductor driving unit configured to switch a driving path between first and second wires of the magnetically coupled inductor such that the magnetically coupled inductor stores electrical energy supplied from the battery power supply or charges the battery power supply with electrical energy stored therein;
   a charging/discharging voltage storage unit configured to store electrical energy supplied from the magnetically coupled inductor or discharge electrical energy stored therein toward the DC link power supply in the boost converter mode, and store electrical energy supplied from the magnetically coupled inductor or the DC link power supply or discharge electrical energy stored therein toward the magnetically coupled inductor in the buck converter mode;
   a first switch unit configured to serve as a diode or switch to transfer electrical energy between the charging/discharging voltage storage unit and the magnetically coupled inductor in the boost converter mode or the buck converter mode; and
   a second switch unit configured to serve as a diode or switch to transfer electrical energy between the DC link power supply and the charging/discharging storage unit in the boost converter mode or the buck converter mode.

2. The bidirectional DC-DC converter of claim 1, wherein the magnetically coupled inductor charges the battery power supply at a first step of the boost converter mode, and the charging/discharging voltage storage unit stores electrical energy supplied from the magnetically coupled inductor at a second step of the boost converter mode.

3. The bidirectional DC-DC converter of claim 2, wherein the charging/discharging voltage storage unit discharges electrical energy stored therein toward the magnetically coupled inductor at a first step of the buck converter mode, and the magnetically coupled inductor stores electrical energy supplied from the charging/discharging voltage storage unit at a second step of the buck converter mode.

4. The bidirectional DC-DC converter of claim 1, wherein the magnetically coupled inductor comprises:
   the first wire connected between one terminal of the first switch unit and a positive terminal of the battery power supply; and
   the second wire connected between a negative terminal of the DC link power supply and a negative terminal of the battery power supply.

5. The bidirectional DC-DC converter of claim 1, wherein the magnetically-coupled-inductor driving unit comprises:
   a first switch connected between the other terminal of the first wire and one terminal of the second wire; and
   a second switch connected between one terminal of the first wire and the other terminal of the second wire.

6. The bidirectional DC-DC converter of claim 1, wherein the charging/discharging voltage storage unit comprises an inductor and capacitor which are connected in series between one terminal of the second switch unit and the negative terminal of the DC link power supply.

7. The bidirectional DC-DC converter of claim 1, wherein the first switch unit comprises:
   a third switch connected between an intermediate node of the charging/discharging voltage storage unit and the other terminal of the first wire; and
   a fourth switch connected between one terminal of the charging/discharging voltage storage unit and the other terminal of the first wire.

8. The bidirectional DC-DC converter of claim 1, wherein the second switch unit comprises a fifth switch connected between a positive terminal of the DC link power supply and one terminal of the charging/discharging voltage storage unit.

9. The bidirectional DC-DC converter of claim 5, wherein the switches are MOS transistors.

10. The bidirectional DC-DC converter of claim 9, wherein the MOS transistor has a structure connected in parallel to a body diode.

11. The bidirectional DC-DC converter of claim 7, wherein the switches are MOS transistors.

12. The bidirectional DC-DC converter of claim 8, wherein the switches are MOS transistors.

* * * * *